US006520557B2

(12) United States Patent
Benthaus et al.

(10) Patent No.: US 6,520,557 B2
(45) Date of Patent: Feb. 18, 2003

(54) POWER ACTUATING SYSTEM FOR FOUR-BAR HINGE ARTICULATED VEHICLE CLOSURE ELEMENT FIELD OF THE INVENTION

(75) Inventors: Oliver Benthaus, Wuppertal (DE); Ronald James Wilde, St. Clair Shores, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/874,897

(22) Filed: Jun. 5, 2001

(65) Prior Publication Data

US 2002/0180233 A1 Dec. 5, 2002

(51) Int. Cl.[7] .............................. B62D 25/10; B60J 5/10
(52) U.S. Cl. .................. 296/76; 296/107.08; 296/146.4
(58) Field of Search ................................ 296/76, 146.4, 296/146.8, 107.08

(56) References Cited

U.S. PATENT DOCUMENTS 2,702,401 A * 2/1955 Vigmostad et al. ........... 16/302
4,294,039 A * 10/1981 Dalheimer et al. ........... 49/248
6,250,707 B1 * 6/2001 Dintner et al. ................ 296/76
6,254,165 B1 * 7/2001 Neubrand .................... 296/76
6,269,521 B1 * 8/2001 Gabel .......................... 16/287
6,298,604 B1 * 10/2001 Rogers, Jr. et al. ...... 296/146.8
6,318,782 B1 * 11/2001 Suzuki et al. .............. 296/37.1
6,352,298 B1 * 3/2002 Hayashi et al. ........ 296/107.08

* cited by examiner

*Primary Examiner*—D. Glenn Dayoan
*Assistant Examiner*—Greg Blankenship
(74) *Attorney, Agent, or Firm*—Kathryn A. Marra

(57) ABSTRACT

An improved four-bar hinge assembly for attaching a trunk deck lid to a vehicle body in which the control link of the four-bar linkage has its usual vehicle-mounted pivot pin replaced by the rotatably driven output drive shaft of a power drive mechanism that is rigidly and directly coupled to the control link to swing to the same and thereby power actuate the four-bar linkage in order to pivot the deck lid between open and closed positions. The hinge elements are located on the weather side of the vehicle body components and the drive shaft extends through the vehicle sheet metal into the weather sealed trunk compartment so that the electro-mechanical drive components are mounted within the weather sealed trunk.

7 Claims, 5 Drawing Sheets

POWER ACTUATING SYSTEM FOR FOUR-BAR HINGE ARTICULATED VEHICLE CLOSURE ELEMENT FIELD OF THE INVENTION

FIELD OF THE INVENTION

This invention relates to power operation of a pivotal vehicle closure element and more particularly to power operation thereof by means of a motor driven four-bar hinge articulation support.

BACKGROUND OF THE INVENTION

Power operation of vehicle closure elements such as doors, hoods, liftgates, tailgates and deck lids is, in principle, known in the prior art. Convenience and ergonomic related benefits associated with providing power operation of closure elements are readily apparent. A growing marketplace trend toward preferring such convenience, and in certain cases, necessary features exist. With respect to hoods and deck lids, certain smaller size passenger vehicles are provided with four-bar hinge articulated support in order to provide a special travel path of the movable hood or deck lid during its motion between fully open and fully closed position in order to accommodate clearance of various body obstructions. Such four-bar hinge articulation also increases the angular range of pivotable travel of the closure element so that the same is out of the way of the personnel gaining access to or from the vehicle compartment closed by the element. In some vehicles the hinge is located on the weather side of the compartment closure weather seal, an adverse environment for locating an electromechanical drive unit for powering the flange. Therefore, a need continues to exist for relatively non-complex, weatherproof, compact, competitive and reliable means of power operation for a four-bar hinge articulation of the vehicle closure element which also readily permits manual actuation thereof in the normal state with the power drive de-energized.

OBJECTS OF THE INVENTION

Accordingly, among the objects of the invention are to provide an improved four-bar hinge articulation of a pivotable vehicle closure element which is capable of power opening and closing the closure element by remote control actuation, that is essentially invisible to the customer or vehicle user with respect to the power drive components of the system, that can be overridden by manual force applied to open and close the closure element, that provides a compact power drive system for the four-bar hinge, that is capable of operation with standard obstacle detection software and which is rugged, compact, economical in construction and installation and in which the electrical components and drive system are shielded from exterior weather by mounting in a normally unused space within a weather sealed compartment of the vehicle.

SUMMARY OF THE INVENTION

In general, and by way of summary description and not by way of limitation, this invention accomplishes one or more of the foregoing objects by providing an improved four-bar hinge assembly for attaching a pivotable vehicle closure element to the vehicle body in which the control link of the four-bar linkage has its usual vehicle-mounted pivot pin replaced by the rotatably driven output shaft of a power drive mechanism. The output shaft is rigidly and directly coupled to the control link to impart swinging motion to the same to thereby power actuate the four-bar linkage in order to pivot the closure element for travel between open and closed positions. The four-bar linkage hinge elements are located in their usual position on the weather side of the vehicle body components. However, the pivot support/drive shaft extends through the vehicle sheet metal separating the weather side from the weather sealed compartment closed by the vehicle closure element so that all components of the electromagnetic drive system are mounted within the weather sealed and preferably normally unused compartment space of the vehicle accessed by the vehicle closure element. The power drive unit preferably comprises a completely encased gear reduction transmission driven by a conventional, reversible electric motor and associated electromagnetic clutch operable remotely via a control circuit of conventional construction. Preferably telescopic gas spring counterbalance elements are also provided to reduce power requirements and to enable manual operation when desired. Limit switches may be provided to de-energize the electric motor and electromagnetic clutch at the end limits of closure element travel, as well as to sense obstructions to travel to de-energize the system. The electromagnetic clutch disengages when de-energized so that the closure element can be moved manually in the event of power failure.

BRIEF DESCRIPTION OF THE DRAWINGS

The foregoing as well as other objects, features and advantages of the present invention will be come apparent from the following detailed description, appended claims and accompanying drawings (which are to engineering scale unless otherwise indicated), wherein:

DETAILED DESCRIPTION OF A PREFERRED EMBODIMENT

Figure 1:
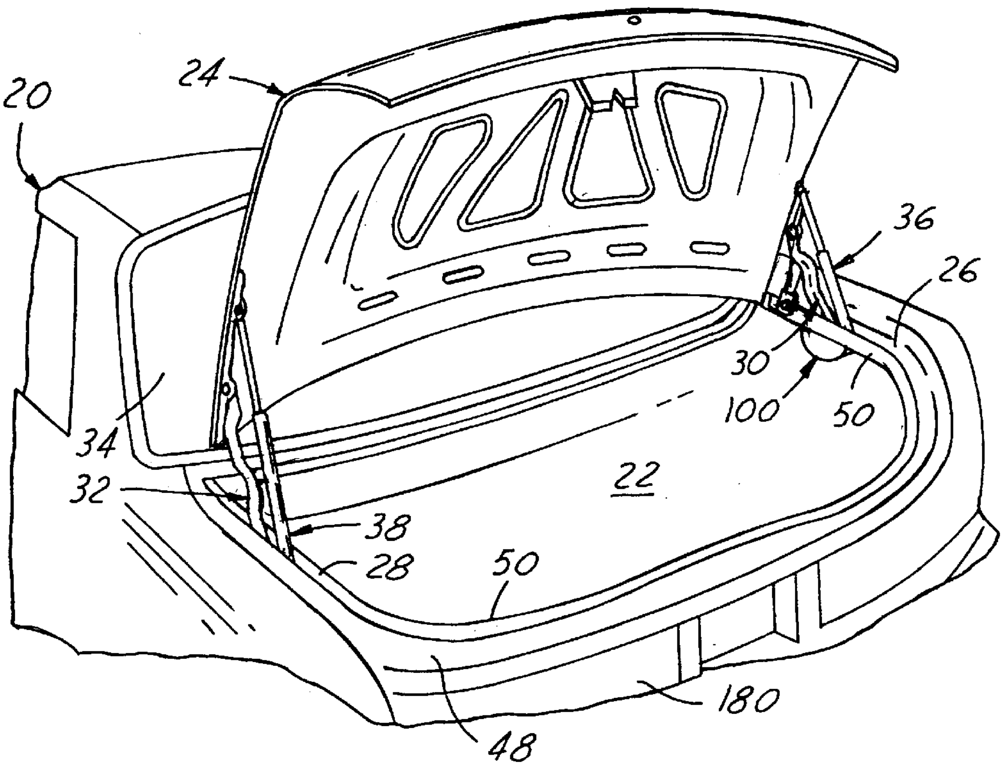
FIG. 1 is a fragmentary perspective view of the rear portion of an automotive passenger vehicle having a rear trunk deck lid shown in open position and attached by a power actuated four-bar hinge construction of the invention to the weather side of the trunk cargo opening.

Referring in more detail to the accompanying drawings, FIG. 1 illustrates fragmentarily the rear portion of an automotive passenger vehicle 20 having the usual trunk cargo compartment 22 at the vehicle aft end. A pivotable vehicle closure element in the form of a conventional trunk deck lid 24 is pivotally attached to the starboard and port sidewalls 26 and 28 of the sheet metal vehicle body components forming the trunk compartment rain gutter 48 by starboard and port four-bar hinge assemblies 30 and 32 that are located on the weather side of the trunk compartment weather sealing system. Each hinge assembly 30, 32 is located near the rear window 34 of the passenger compartment of vehicle 20 so that deck lid 24 swings between and to the open position thereof shown in FIGS. 1–5 and the fully closed position shown in FIG. 6. Conventional starboard and port telescopic counterbalancing gas springs 36 and 38 are operably coupled between deck lid 24 and rain gutter walls 26 and 28 respectively to provide suitable counterbalancing forces to assist in the opening and closing of deck lid 24.

Figure 4:
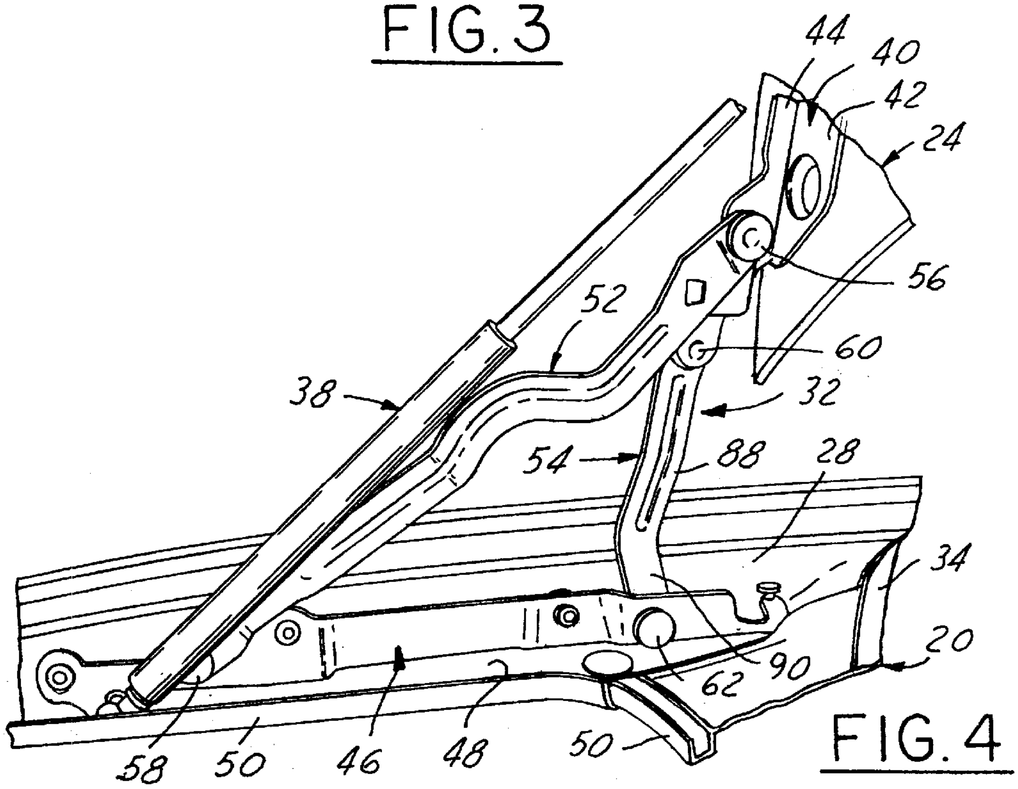
FIG. 4 is a fragmentary perspective view of the conventional four-bar hinge assembly and associated gas spring counterbalance provided on the port side of the vehicle, and operated as an unpowered four-bar hinge slave articulation.

Referring first to the port side slave four-bar hinge assembly 32 shown in FIG. 1 and in greater detail in FIG. 4, hinge assembly 32 is of conventional construction and comprises a deck lid bracket 40 in the form of an angle plate having one flange 42 attached to the interior side of deck lid 24 and another flange 44 protruding therefrom. Hinge assembly 32 further includes a mounting bracket 46 riveted or otherwise suitably secured to the sidewall 28 of the body trunk sheet metal that defines the outboard wall of the rain gutter 48 surrounding trunk opening 22. The inner wall of rain gutter 48 is defined by the usual upturned sheet metal lip 50.

Figure 5:
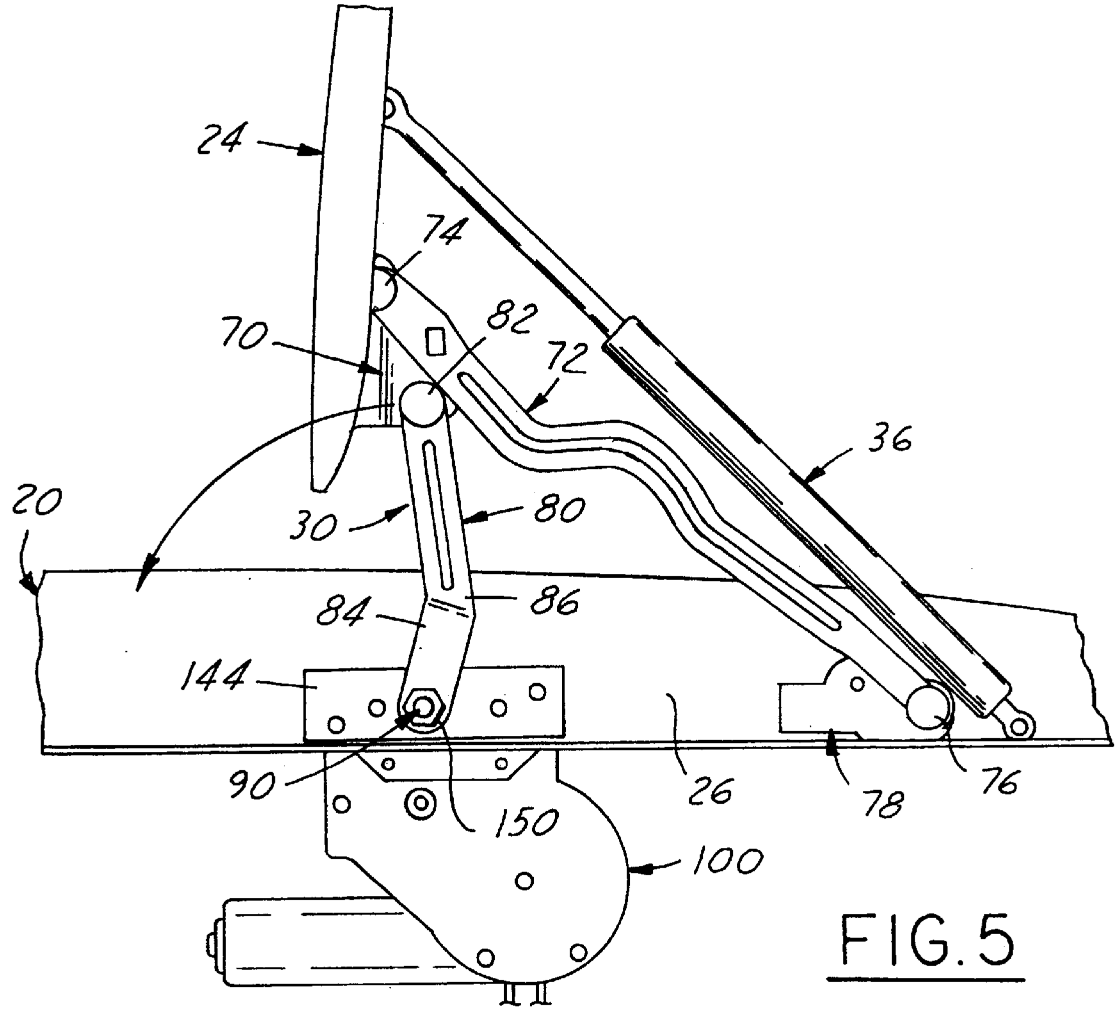
FIGS. 5 and 6 are side elevational views of the starboard side hinge and drive components of FIGS. 2 and 3 and respectively illustrating the fully opened and fully closed position of the trunk deck lid and associated four-bar hinge and counterbalance components.
Figure 6:
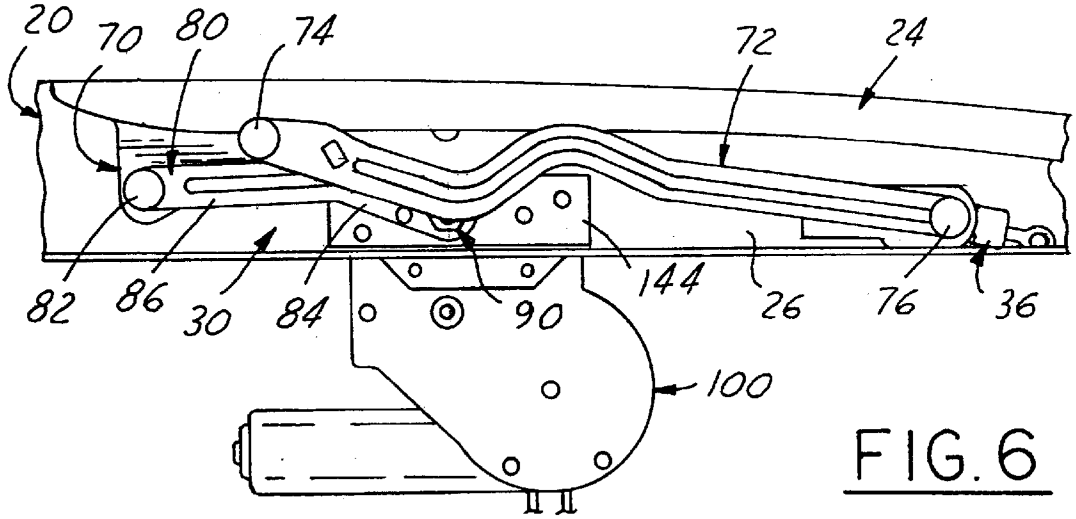

Deck lid bracket 40 is attached to body mounting bracket 46 for swinging movement between the closed position shown in FIG. 6 and the open position shown in FIGS. 1–5 by hinge link 52 and control link 54 of the slave linkage assembly 32. Hinge link 52 is pivotally attached at one end to deck lid bracket 40 by a first pivot pin 56 and at the other end to mounting bracket 46 by a second pivot pin 58. Control link 54 is pivotally attached at one end to deck lid bracket 40 by a third pivot pin 60 that is spaced from pivot pin 56 and at its opposite end to mounting bracket 46 by a fourth pivot pin 62 that is spaced from pivot pin 58. Thus, deck lid bracket 40, and links 52 and 54 that attach deck lid bracket 40 to mounting bracket 22 for swinging movement of deck lid 24, constitute a four-bar linkage type or hinge assembly 32 that are exposed to ambient weather conditions.

In accordance with one principal feature of the present invention, at least one of the two hinge assemblies 30 and 32 is directly power operated. In this illustrative embodiment disclosed herein starboard four-bar hinge assembly 30 is modified to become a power operated four-bar hinge assembly. Basically, this is accomplished pursuant to the invention by converting the idler pivot connection of pin 62 of hinge assembly 32 into a torque transmitting pivot support construction in hinge assembly 30. Hinge assembly 30 thus also constitutes a deck lid bracket 70 (which is the mirror image of bracket 40), a main hinge link 72 (which is the mirror image of hinge link 52) connected at its opposite ends by a pivot pin 74 to bracket 70 and by pivot pin 76 to a shortened (and thus modified) mounting bracket 78 fixed to rain gutter sidewall 26. A control link 80 of hinge assembly 30 is connected at one of its opposite ends by a pivot pin 82 to bracket 70, and pin 82 is spaced from pin 74 in the manner of the spacing of pivot pins 56 and 60.

The principle difference between slave hinge assembly 32 and powered hinge assembly 30 in the vehicle-mounted end is that control link 80 is modified from control link 54 in having a heavy duty connector lug arm 84 welded to an upper section 86 of link 80 and cocked at an angle thereto (FIGS. 2, 5 and 6) in manner of the angular relationship of the upper and lower canted sections 88 and 90 of control link 54 of hinge assembly 32 (FIG. 4). The lower end of lug 84 is mounted on and keyed for rotation with a combination drive shaft and pivot pin journal support shaft 90 that protrudes through outboard rain gutter wall 26, and described in more detail hereinafter in conjunction with FIGS. 7 and 9.

Pivot power output shaft 90 is bi-directionally rotatably power driven by an electro-mechanical drive unit 100 also provided in accordance with a further principal feature of the present invention, to thereby power actuate hinge assembly 30 through its operable angular range of linkage articulation to move deck lid 24 throughout its full range of angular travel between open and closed positions. Likewise, by forces transmitted via deck lid 24, the non-powered hinge assembly 32 is slave driven in like manner.

Figure 7:
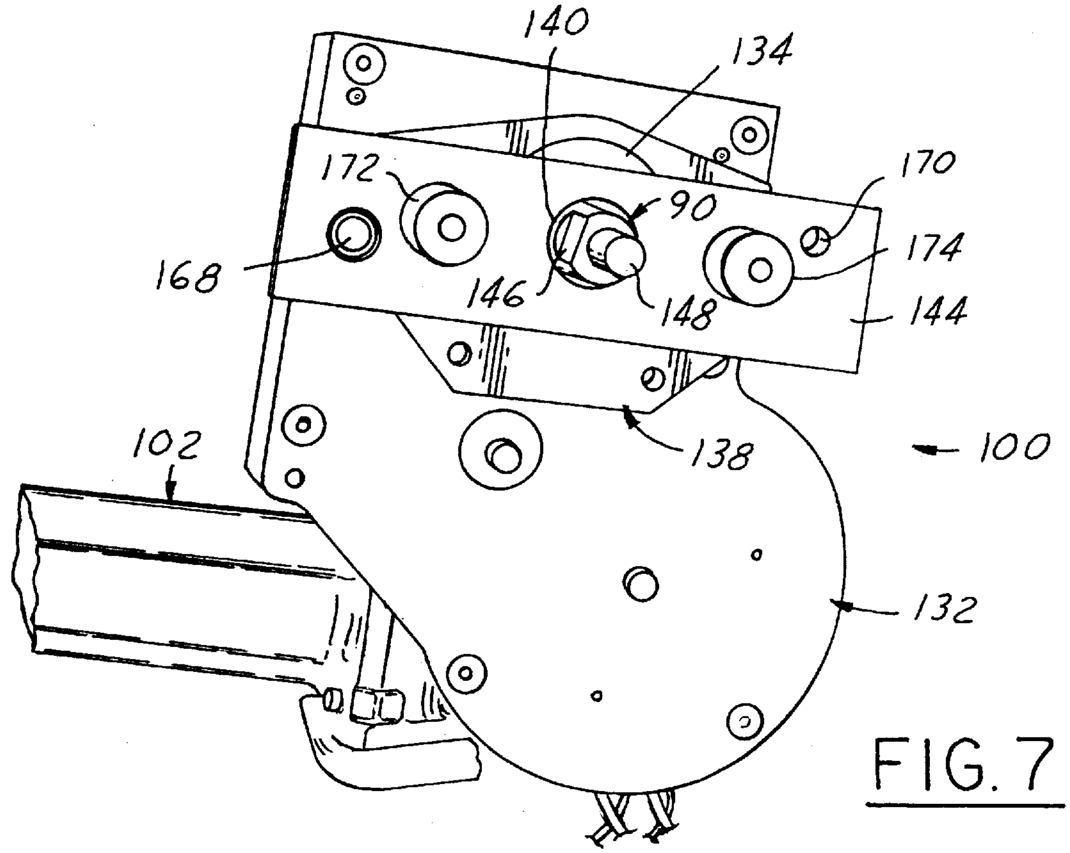
FIG. 7 is a view of the port side of the electrical mechanical drive unit and associated vehicle body mounting hardware for the same shown by themselves apart from the vehicle.
Figure 8:
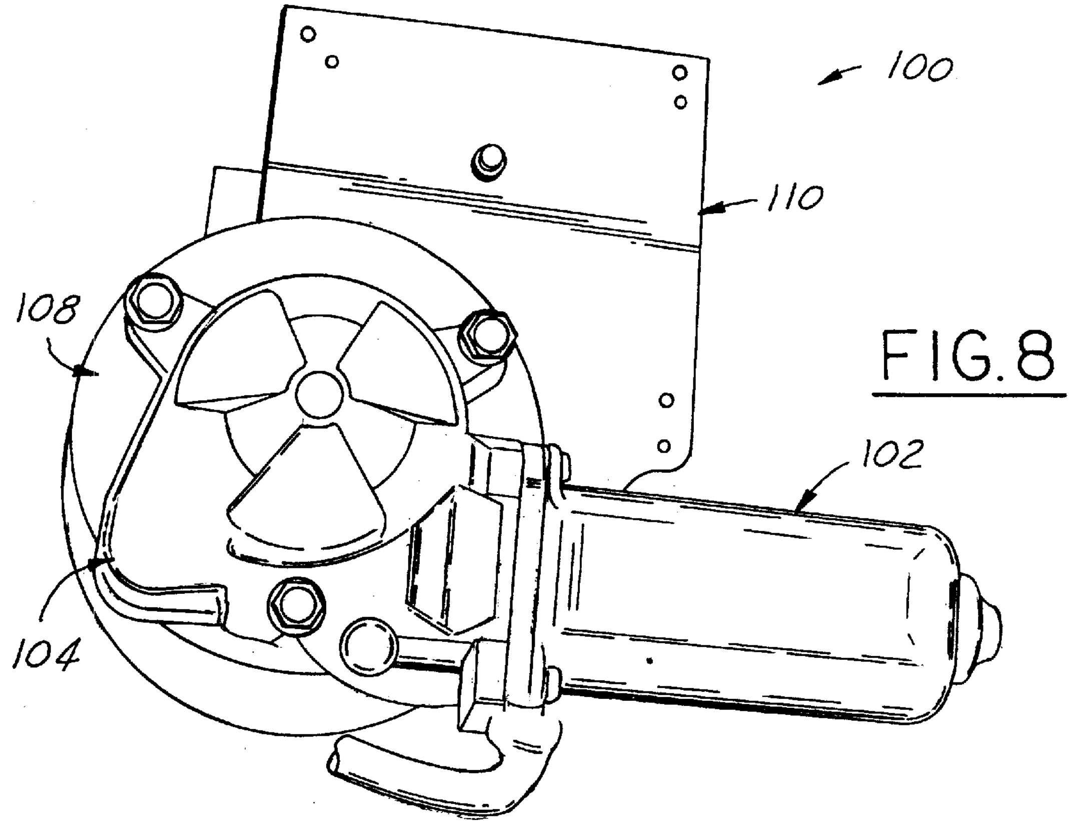
FIG. 8 is a side elevational view of the starboard side of the hinge drive unit of FIG. 7.
Figure 9:
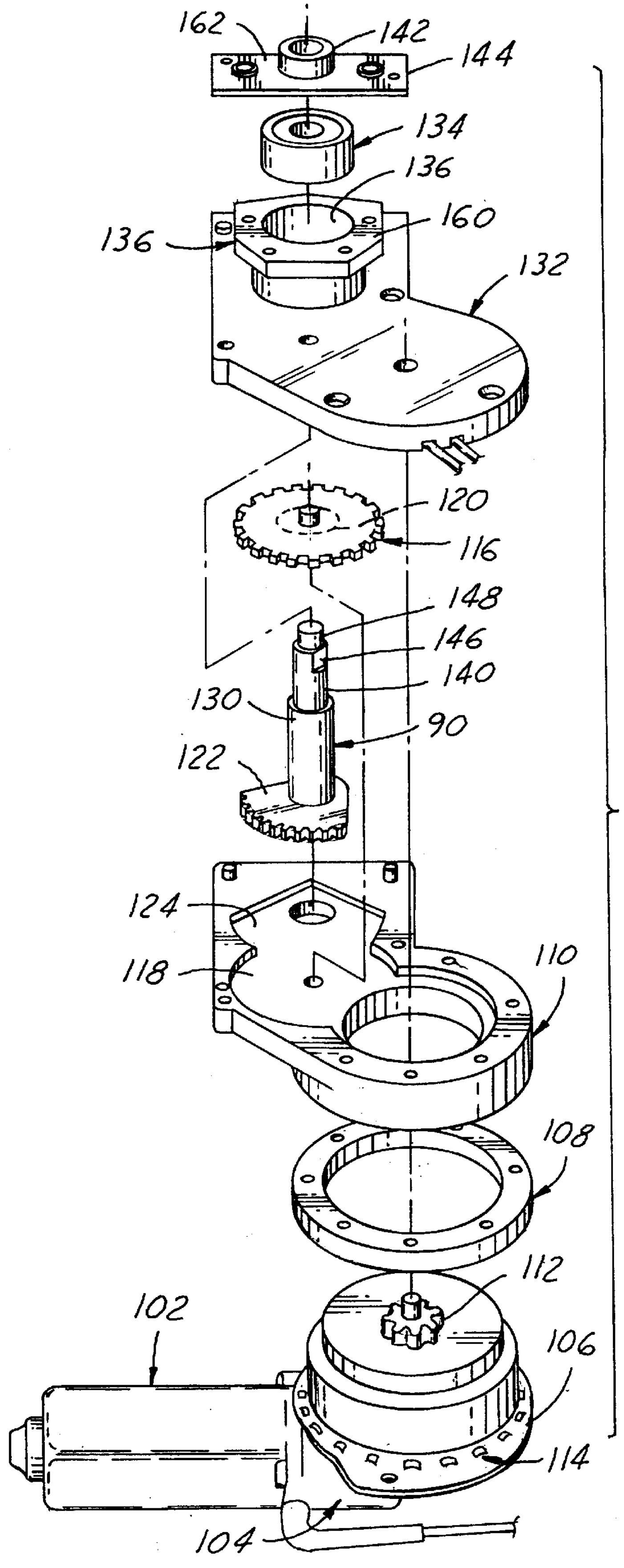
FIG. 9 is an exploded perspective view of the hinge electro-mechanical drive unit seen in FIGS. 1–3 and 5–8.

Referring to FIGS. 7, 8 and 9, drive unit 100 includes a reversible electric motor 102 of conventional commercially available construction that is attached to and supported by a housing of a conventional commercially available electromagnetic clutch subassembly 104. A bracket plate 106 (FIG. 9) of clutch 104 attaches to a motor mount ring 108 that in turn attaches to a housing plate part 110 specially provided in accordance with the invention. The electromagnetic clutch component 104 includes a worm gear (not seen) on the output shaft of motor 102 that drives a helical gear (not seen) within the clutch housing and that is clutch coupled to rotatably and bi-directionally drive an output pinion gear 112. An optical sensor disk 114 is also mounted between bracket 106 and pinion gear 112 and is rotatably driven in unison with pinion 112.

Pinion 112 drivingly meshes with the teeth of enlarged diameter spur gear 116 that is rotatably journaled in a cavity 118 of housing 110 located on the side opposite motor/clutch unit 102/104. Spur gear 116 is a compound gear having a small pinion 120 (indicated schematically via broken lines in FIG. 9) attached thereto on its underside for rotation therewith. The teeth of pinion 120 of compound gear 116 drivingly mesh with the spur gear teeth of a sector gear 122 that seats in a housing cavity 124 opening to housing cavity 118 and having sufficient angular extent to accommodate the pivotal angular working range of sector gear 122, i.e., the range of angular travel of control link 80 between the lid-open and lid-closed positions of FIGS. 5 and 6 respectively. A hub (not shown) on the underside of sector gear 122 is journaled in a bore 126 of housing 110.

Figure 2:
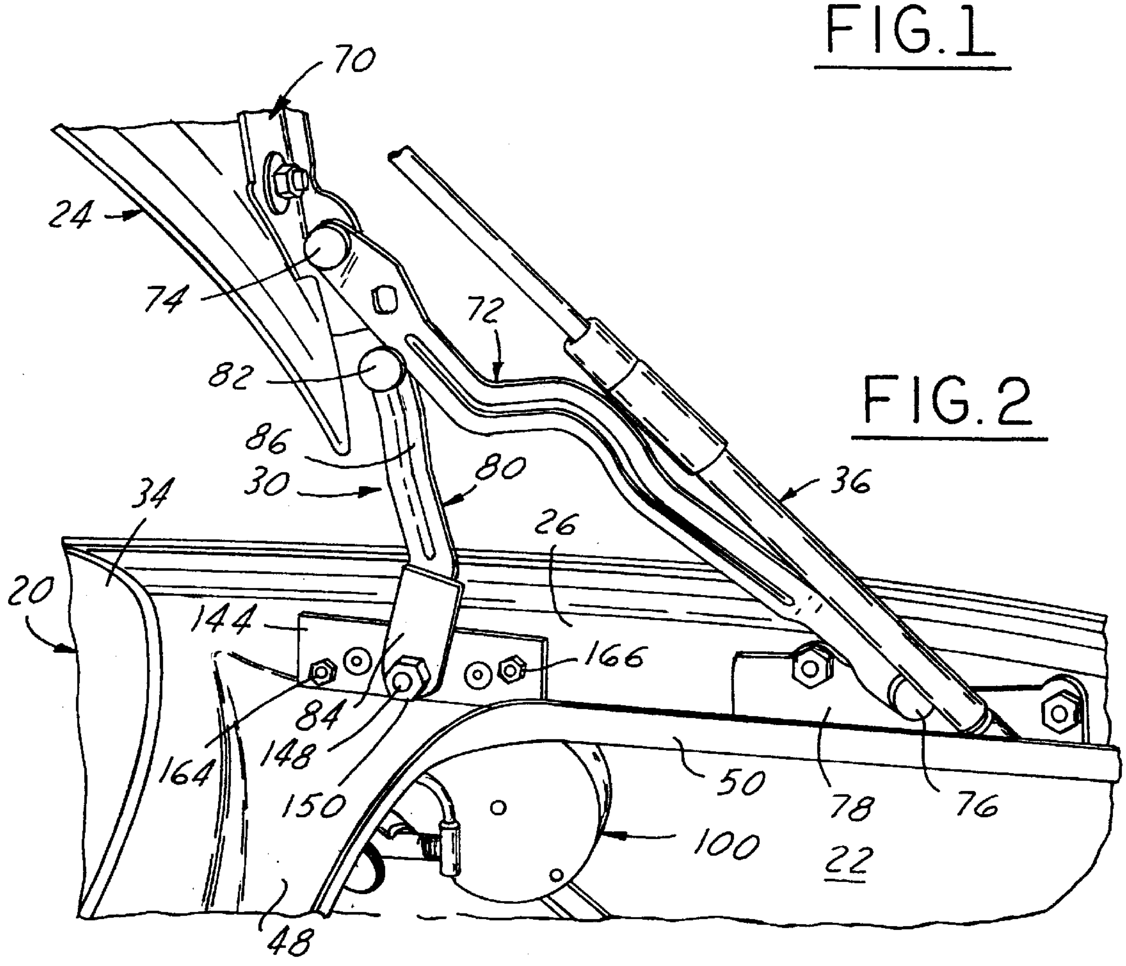
FIG. 2 is a fragmentary perspective view of the starboard side four-bar linkage and associated power drive components of the invention with the deck lid shown in fully open position as viewed from the port side of the vehicle looking down into the starboard side of the trunk compartment.

Output sector 122 has fixed to its upper side (as viewed in FIG. 9) for bi-directional rotation therewith output shaft 90 that extends coaxially with the center of rotation of sector 122. The largest diameter primary shank portion 130 of shaft 90 extends through an registering opening in a cover 132 of drive unit 100, and is journaled in a pass-through bearing 134 in turn received in a bore 136 of a mounting bracket 138 welded to the outer face of cover 132. A reduced diameter secondary shank portion 140 of shaft 90 is journaled in an annular seal housing 142 fixed to an outer seal plate 144. The end of shank 140 remote from sector 122 is provided with a pair of flats 146 that drivingly register with flatted portions of the through-bore of lug arm 84 of control driving link 80. The distal end 148 of shaft 128 is threaded to receive a locking nut 150 thereon, as shown in FIG. 2. Note that outer seal plate 144 is shown inverted in FIG. 9 relative to the remaining parts of FIG. 9 and hence the side of plate 144 that is seen in FIGS. 2, 5, 6 and 7 is the side hidden from view in FIG. 9.

Figure 3:
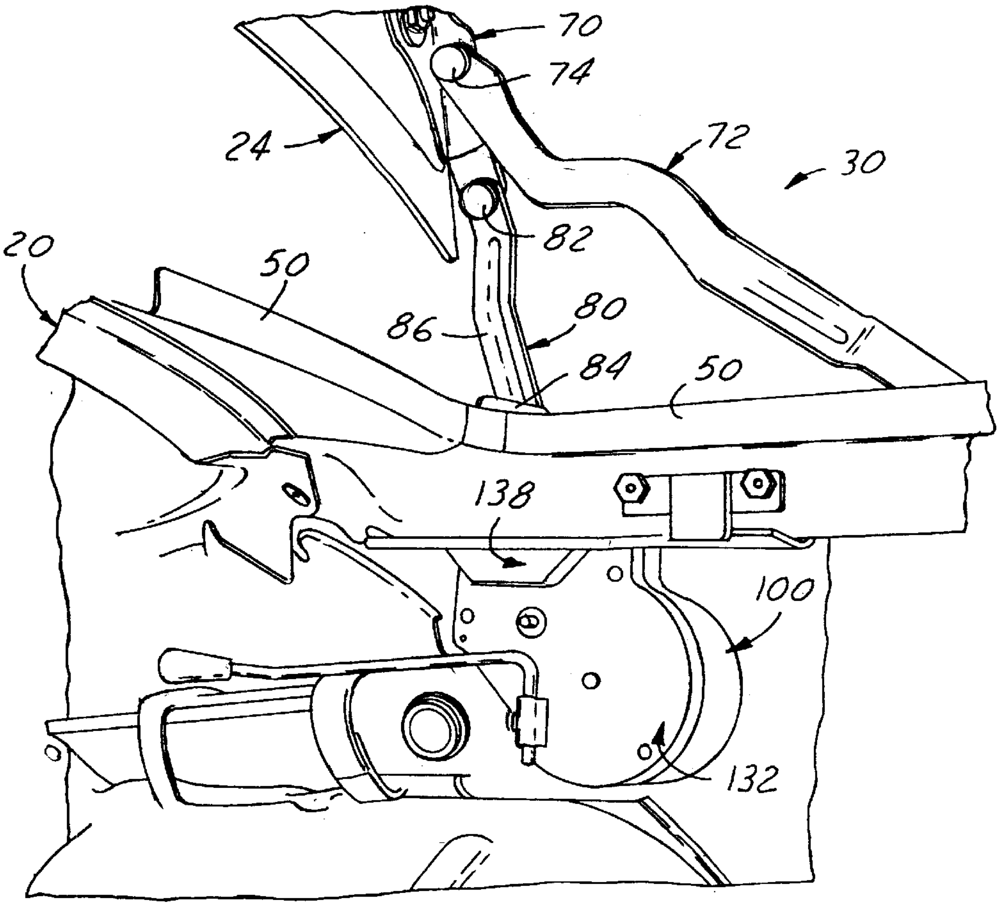
FIG. 3 is a fragmentary perspective view of the starboard side components of FIG. 2 but viewed from the port side at a lower elevation (than that of FIG. 2) and from within the trunk compartment.

In accordance with a further feature of the present invention, the electromechanical drive unit 100 is mounted in the weather sealed and normally unused space available in the trunk compartment 22 adjacent the vehicle quarter panel and outboard of gutter wall 26, as best seen in FIGS. 1, 2 and 3. The vehicle body mounting platform for supporting drive unit 100 is the outer sidewall 26 of rain gutter 48. When so mounted, a flange 160 of mounting bracket 138 (FIG. 9) bears against the outboard surface of gutter wall 26, and a surface 162 of seal plate 144 bears against the inboard surface of gutter wall 26. Suitable openings are provided in wall 26 to accommodate a pair of mounting bolts 164 and 166 (best seen in FIG. 2) that pass through an associated pair of openings 168 and 170 (FIG. 7) in plate 144 to thereby fasten plate 144 to gutter wall 26. A pair of Allen head socket bolts 172 and 174 pass through associated openings in plate 144 and threadably register with threaded sockets in mounting flange 160 to thereby clamp flange 160 against the outboard surface of wall 28.

In the mounting of plate 144 to wall 28, a suitable weather sealing bedding compound is applied to the abutting surface of plate 144 and wall 28. Suitable seals are also provided for pass-through bolts 172 and 174. O-ring seals (not seen) are provided in the pass-through seal housing 142 that sealably engage shaft shank 140. Hence, water collecting in rain gutter 48 cannot leak through to the interior of trunk compartment 22 via the mounting hardware nor output shaft journals for unit 100. Thus, drive unit 100 is protected from rain and wash water, snow, ice and dirt. Unit 100, as well as the electrical leads to motor 102, are also tucked away in the uppermost quarter panel space and thus also protected from bumping abuse from loading and unloading objects into and out of trunk space 22, as well as unlikely being bumped by cargo therein during vehicle travel.

In operation, trunk deck lid 24 is swung from the closed position of FIG. 6 to the open position of FIGS. 1–5 by energizing electric motor 102 and electromagnetic clutch 104 to generate drive torque that is multiplied via gear reduction to thereby rotate sector gear 122 and hence output shaft 90 so as directly to swing hinge link 80 clockwise about 90° from its position in FIG. 6 to that of FIG. 5. This power actuation of drive hinge assembly 30 and slave hinge assembly 32, coupled with their four-bar linkage articulation, causes trunk deck lid 24 to be moved slightly aft away from rear window 34 as the same is tilted upwardly and pivoted counterclockwise as viewed in FIGS. 5 and 6. The aft end of lid 24 is thus raised away from the vehicle body tail section 180 as it moves to the fully open position shown in FIG. 1. The slave hinge assembly 32, on the port side of vehicle 20, operates in the same way at the same time so that trunk deck lid 24 swings open in a balanced manner, gas springs 36 and 38 providing counterbalancing forces to assist this motion.

It will thus be seen that the four-bar hinge assemblies 30 and 32 on each side of the trunk space 22 control movement of trunk deck lid 24 in the same manner as previously provided solely for manual operation. Hence, essentially very little redesign or modification of the existing four-bar hinge assemblies is required to accomplish remotely controlled power assist operation in accordance with the invention.

When deck lid 24 is fully opened, a conventional limit switch or the like is actuated to de-energize electric motor 102 and electromagnetic clutch 104. Deck lid 24 is closed by reversing electric motor 102 and engaging clutch 104 so that sector gear 122 is driven back to the position that establishes the relationship of the parts shown in FIG. 6. When deck lid 24 is fully closed another conventional limit switch is likewise actuated to de-energize electric motor 102 and electromagnetic clutch 104. Electromagnetic clutch 104 is operable to disengage when de-energized so that deck lid 24 can be moved manually in the event of a power failure, or when access to the remote controls is not convenient or available. Likewise, conventional obstruction sensing circuitry is preferably employed to de-energize electromagnetic clutch in the event deck lid 24 strikes an obstruction during travel between open and closed positions.

The power operating system described above employing a single drive unit 100, with the assist of counterbalancing forces from gas springs 36 and 38, is typically adequate for smaller vehicles and deck lids 24 that are lighter in weight. However, if more power and/or power-balanced operation is desired, two mirror-image drive units may be provided, one on port and one on starboard, constructed and installed in the manner as the single starboard unit 100 described hereinabove, so that both four-bar hinge assemblies 30 and 32 are directly power actuated.

From the foregoing description, and drawings as referenced therein, it will now be apparent to those skilled in the art that the powered deck lid actuator of the invention amply fulfills one or more of the aforestated objects and provides many novel features and advantages over the prior art. The power actuating system of the invention is compact, rugged, fully weather-protected, does not require any exposed cables or rack and pinion drives, has a fully encased power train and drive unit 100 that provides high force multiplication with internal gear reduction, can be lubricated permanently without danger of lubricant leakage, and is economical to manufacture and install and efficient in operation due to the direct mechanical rotary drive connection between the output shaft 90 and control link 80 of the four-bar hinge assembly 30. The clutch contacts (not seen) of the electrical control circuit are readily housed within space available in the cover 132. Likewise, the optical sensor disk 114 is well protected in housing cover 130 that in turn provides a mount for a conventional optical sensor cooperating with disk 114 and the remote control computer program of conventional computer control circuitry.

While port side mounting bracket 46 is shown in FIG. 4 and described as a separate piece, and in this particular instance is a pre-existing part on vehicle 20, it should be understood that a portion of the sidewall 26 of rain gutter 48 can serve as the mounting bracket with hinge link 72 pivotally connected directly to the sidewall to form the four-bar linkage or hinge. Similarly, the deck lid bracket 70 can be an integrated part of the deck lid rather than a separate piece as shown and described hereinabove. Thus, many modifications and variations of the present invention, in the light of the above teachings, will now become evident to those of ordinary skill in the art. It is, therefore, to be understood that, within the scope of the appended claims, the invention may be practiced otherwise than as specifically described.

What is claimed is:

1. In an automotive vehicle having a pivotable vehicle closure element for opening and closing an access opening of a storage compartment of the vehicle, wherein the closure element is movable between open and closed positions and is supported by a four-bar hinge assembly having a pair of swinging links operably coupled between the closure element and the vehicle body, the improvement in combination therewith of a power actuating system for automatically opening and closing the closure element comprising:

an electro-mechanical power drive unit stationarily mounted on the vehicle adjacent the hinge assembly, said drive unit having an output shaft rotatable about an axis under the control of an electric motor of said drive unit, and means for applying swinging torque to one of said links of said four-bar linkage comprising a pivotal support connection for said one link to the vehicle body, said output shaft being oriented coaxial with a pivot axis of said pivotal support connection and being directly operably connected to said one link so that rotation of the output shaft directly applies swinging torque to said one link of said hinge assembly and is bi-directionally rotatable through an angular range of travel corresponding to a swing travel of said one link as the closure element is moved between open and closed positions and vice versa.

2. The apparatus of claim 1 wherein said hinge assembly and the vehicle body pivot connections for said hinge assembly are disposed in a vehicle body rain gutter provided adjacent the storage compartment closed by the closure element and thus said hinge assembly is located on a weather side of a weather sealing system provided between the vehicle body and closure element, and wherein said drive unit is provided on an interior weather sealed side of the weather sealing system and mounted to the vehicle body in the storage space of the storage compartment, and wherein the drive unit output shaft is constructed and arranged to extend rotatably through a sealed opening in the rain gutter body for direct coupling to said one link.

3. The apparatus as set forth in claim 2 wherein counter-balancing springs are provided to supplement opening and closing forces required to actuate the closure element through the power actuated hinge assembly.

4. The apparatus as set forth in claim 3 wherein the drive unit includes said electric motor and an electromagnetic clutch that are supported and operable within a drive unit casing, said electromagnetic clutch having an input member that is driven by the electric motor and an output member that drives a pinion gear, a compound gear having a large diameter spur gear and an associated small diameter spur gear, said pinion driving the large diameter spur gear of the compound gear, said small diameter gear of the compound gear driving a sector gear, said output shaft being directly coupled to said sector gear.

5. The apparatus as set forth in claim 1 wherein the drive unit includes said electric motor and an electromagnetic clutch that are supported and operable within a drive unit casing, said electromagnetic clutch having an input member that is driven by the electric motor and an output member that drives a pinion gear, a compound gear having a large diameter spur gear and an associated small diameter spur gear, said pinion driving the large diameter spur gear of the compound gear, said small diameter gear of the compound gear driving a sector gear, said output shaft being directly coupled to said sector gear.

6. In an automotive vehicle having a pivotable vehicle closure element for opening and closing an access opening of a storage compartment of the vehicle, wherein the closure element is movable between open and closed positions and is supported by a hinge assembly having a pair of swinging links operably coupled between the closure element and the vehicle body, the improvement in combination therewith of a power actuating system for automatically opening and closing the closure element comprising:

an electro-mechanical power drive unit stationarily mounted on the vehicle adjacent said hinge assembly, said drive unit having an output shaft rotatable about an axis under the control of an electric motor of said drive unit, and a power transmission for applying swinging torque to said hinge assembly and being operably connected to said drive unit such that rotation of the output shaft applies swinging torque to said hinge assembly and is bi-directionally operable through an angular range of travel corresponding to a swing travel of said hinge assembly as the closure element is moved between open and closed positions and vice versa, said hinge assembly being disposed adjacent the storage compartment closed by the closure element and being located on a weather side of a weather sealing system provided between the vehicle body and the closure element, and wherein said drive unit is provided on an interior weather sealed side of the weather sealing system and mounted to the vehicle body in a storage space of the storage compartment, and wherein said power transmission is constructed and arranged to extend through a sealed opening in the vehicle body for operably drive coupling to said hinge assembly.

7. The apparatus as set forth in claim 6 wherein counter-balancing springs are provided to supplement opening and closing forces required to actuate the closure element through the power actuated hinge assembly.

* * * * *